April 30, 1957   C. B. ROCKHILL   2,790,567
AUTOMATIC ELEVATING OR LOWERING CONVEYOR
Filed Jan. 20, 1956   4 Sheets-Sheet 4

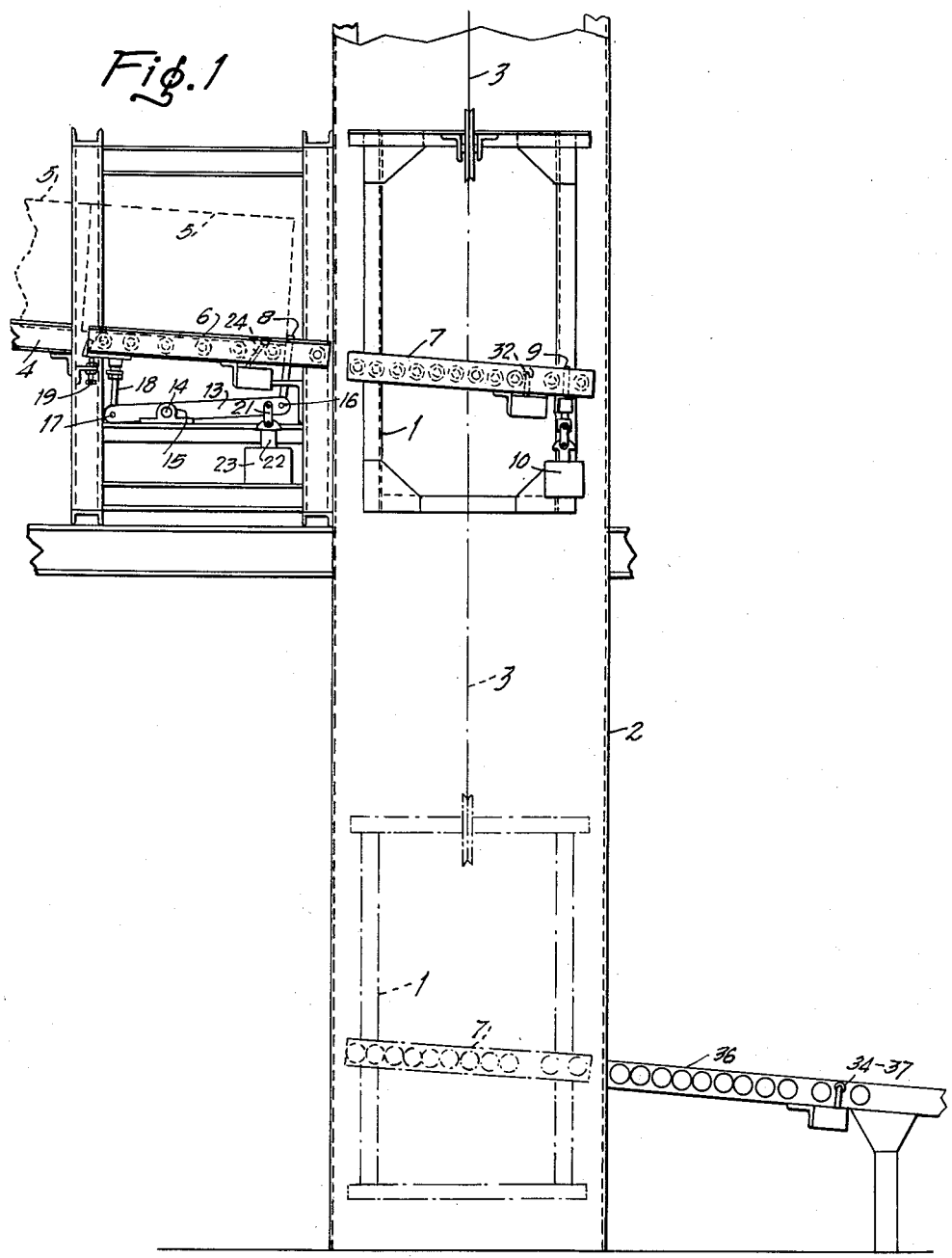

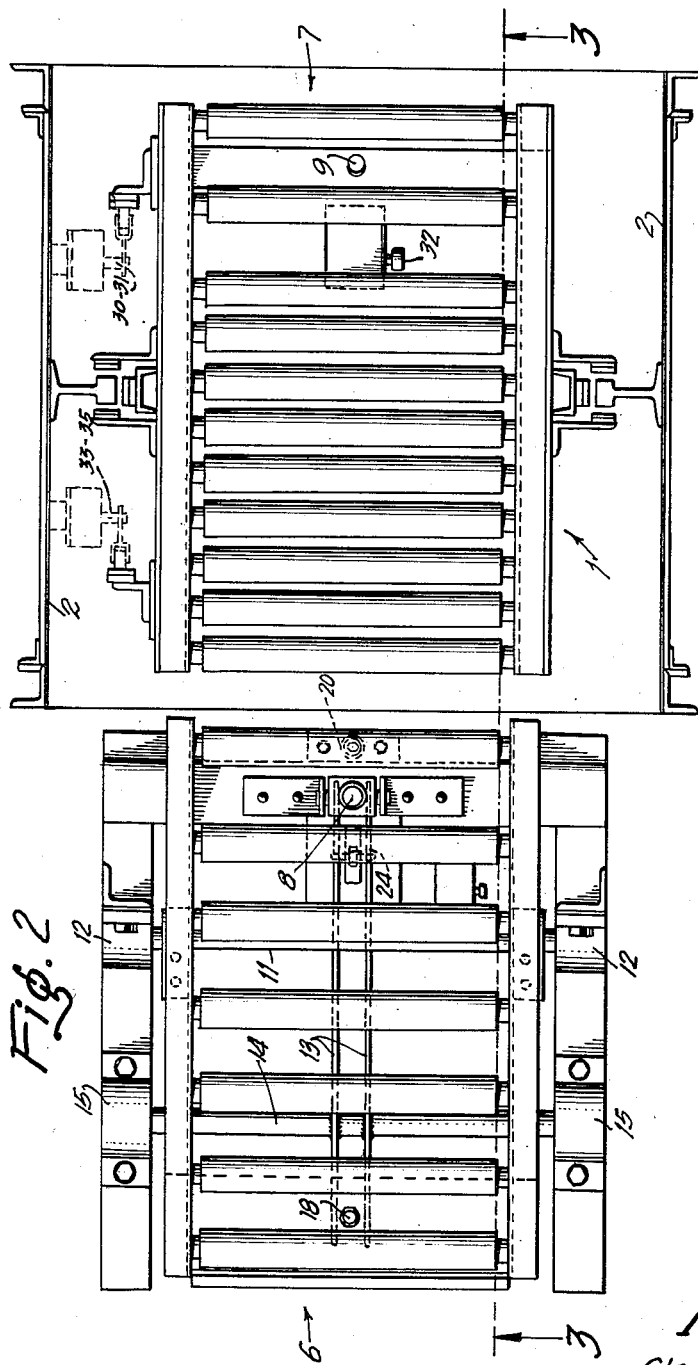

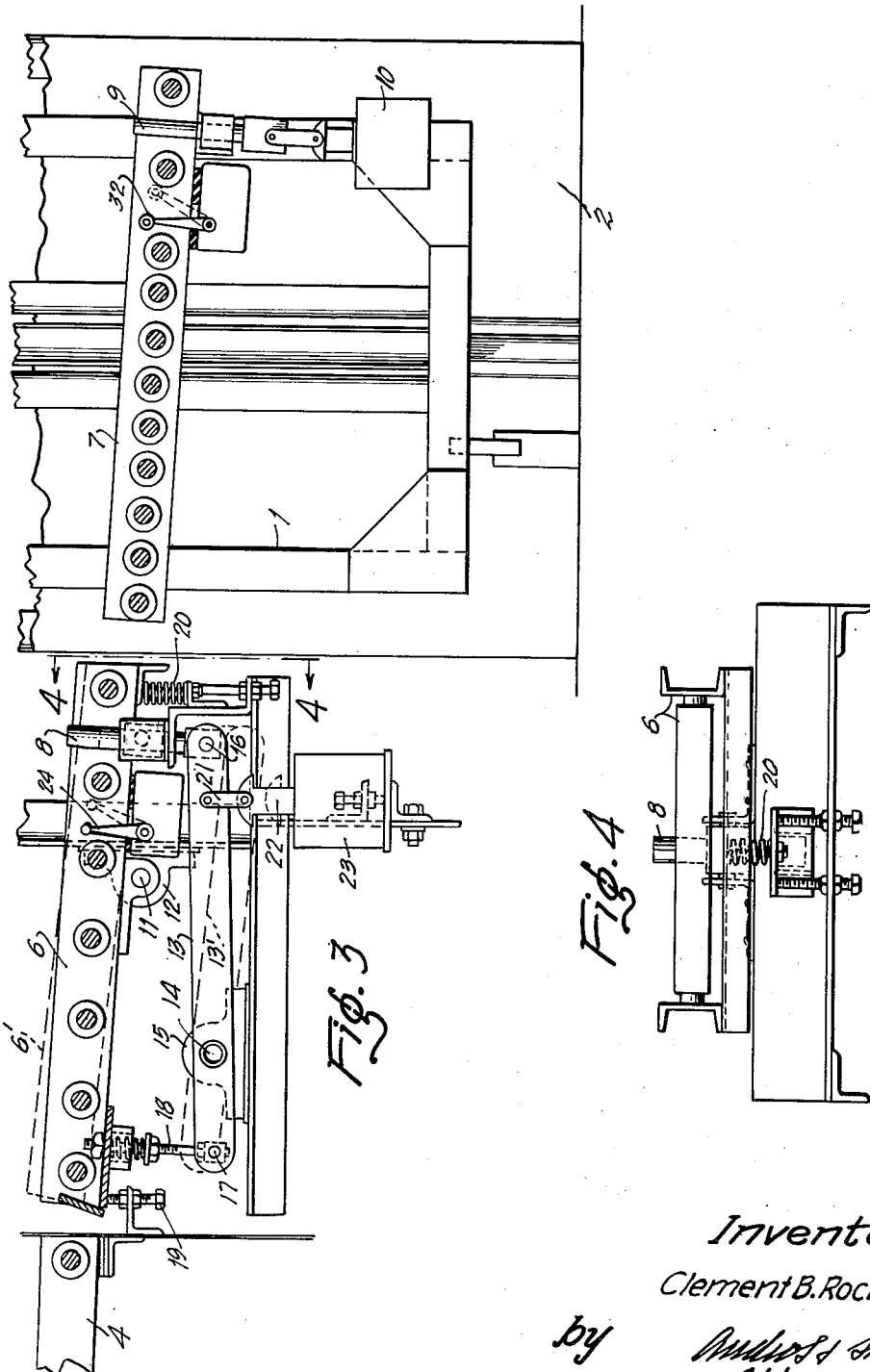

Inventor
Clement B. Rockhill
by Audett & Smith
Attorneys

United States Patent Office 2,790,567
Patented Apr. 30, 1957

2,790,567

AUTOMATIC ELEVATING OR LOWERING CONVEYOR

Clement B. Rockhill, Hillsdale, N. Y., assignor to Gifford-Wood Co., Hudson, N. Y., a corporation of New York Application January 20, 1956, Serial No. 560,295

5 Claims. (Cl. 214—95)

My invention relates to conveyors and particularly to automatic devices which are adapted to convey boxes, or other containers or packages, from one floor to another, or from one machine to another.

The principal object of my invention is to provide a device which will cooperate with gravity roller conveyors from which boxes, or other containers, will be automatically loaded on another conveyor at one station, automatically carried by said conveyor to another station, automatically discharged from said conveyor onto another conveyor at the station to which they are to be delivered; and said conveyor, after discharging its load, will automatically return to the loading station and continue its carrying and delivering operations as long as there are boxes or other containers at the loading station to be carried thereby.

I accomplish this object by the means described below and in the accompanying drawings in which, for purposes of illustration only, I have shown my invention in connection with an elevator as the intermediate conveyor.

Fig. 1 is a more or less diagrammatic view of the elevator housing, the gig therein, a portion of a conveyor which delivers the boxes to the gig, and a portion of a conveyor which receives the boxes discharged from the gig;

Fig. 2 is an enlarged top view of that portion of the conveyor which delivers boxes to the gig, and the box support on the gig onto which the boxes are discharged from the loading conveyor;

Fig. 3 is a section of Fig. 2 in the plane 3—3;

Fig. 4 is a view of the end of the conveyor which delivers boxes to the gig as viewed through the plane 4—4 of Fig. 3;

Figure 6:
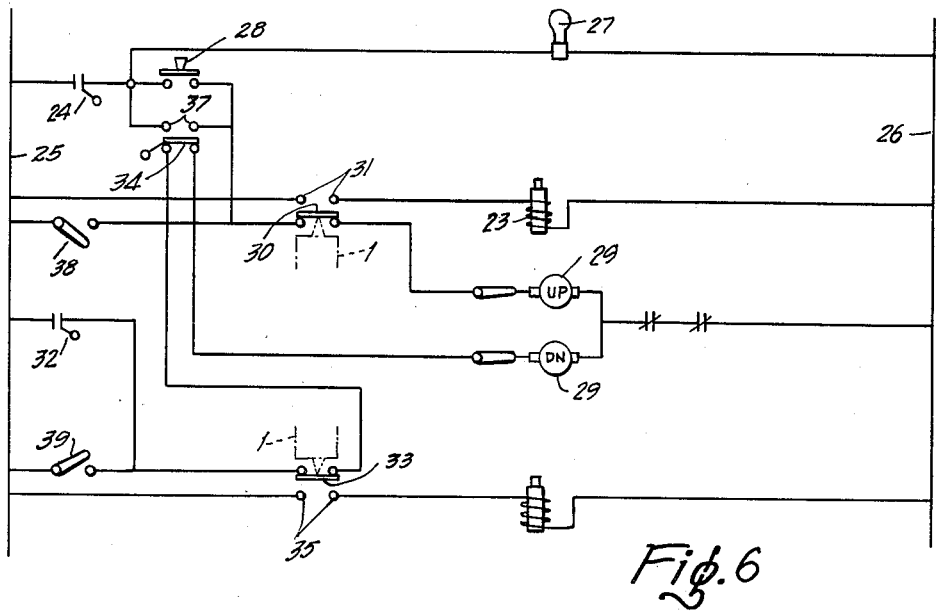
Fig. 6 is a wiring diagram.

Referring to the drawings:

1 is the gig, 2 is the gig housing and 3 is the cable, by means of which the gig is raised and lowered. 4 is a portion of the fixed gravity roller conveyor down which the boxes 5 are delivered to a tiltable portion 6 of the conveyor. The gig is provided with a gravity roller conveyor 7 upon which the boxes are delivered from the portion 6 of the delivery conveyor.

The downward movement of the boxes on the portion 6 of the conveyor is limited by the stop 8 and the downward movement on the box support of the gig is limited by the stop 9. The stop 9 can be pulled down by the solenoid 10 to allow the box on the support 7 to roll therefrom, and the tiltable portion 6 of the conveyor is mounted on a shaft 11 carried by the bearings 12 (see Figs. 2 and 3).

Bars 13 are welded to the shaft 14 which is mounted in the bearings 15 beneath the portion 6 and nearer the high end thereof than the low end (see Figs. 2 and 3). The stop 8 is pivotally connected to the bars at 16, and the higher end of the portion 6 of the conveyor is pivotally connected to the bars 13 at 17 by means of the threaded element 18. The extent to which the higher end of the portion 6 may be lowered is limited by the adjustable stop 19, so that it is normally in line with the fixed portion 4 of the conveyor. Beneath the lower end of the portion 6 is a compression spring 20 which not only absorbs the tilting stop shock but stores energy which is utilized to move the portion 6 back into alignment with the portion 4 and into contact with the stop 19 when the solenoid is de-energized.

In order simultaneously to withdraw the stop 8, to allow a box on the portion 6 to move onto the gig, and tilt the portion 6 so that the higher end is further elevated to prevent a following box on section 4 of the conveyor from moving onto the portion 6, the bars 13 are pivotally connected by the links 21 to the armature 22 of the solenoid 23. Thus, when the solenoid is energized, the stop 8 is withdrawn or pulled downwardly, and the higher end of the portion 6 of the conveyor is raised so that the portion 6 is in the position shown in dotted outline at 6'. When the stop 8 is withdrawn, a box supported on the portion 6 may roll therefrom onto the support 7 on the gig until it hits the stop 9.

Figure 5:
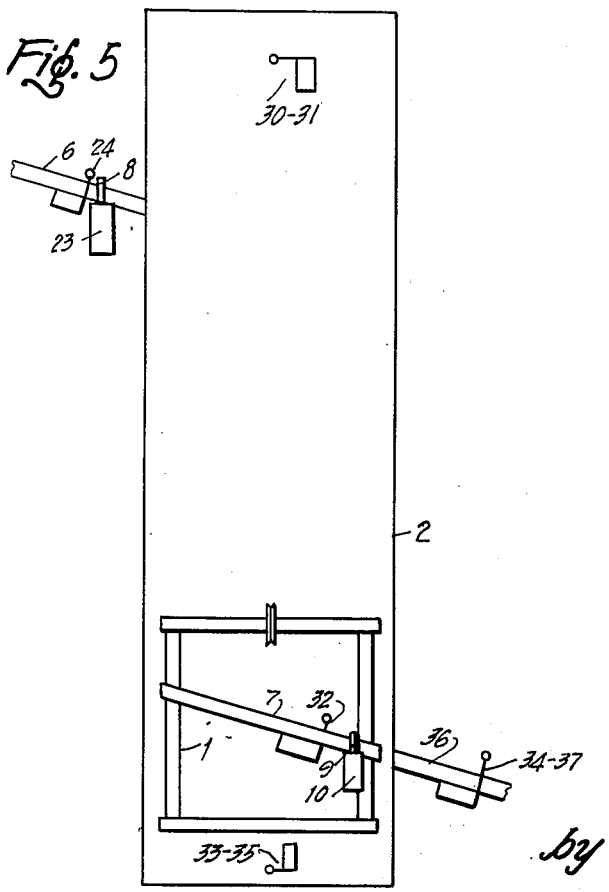
Fig. 5 is a diagrammatic elevation view of the gig and portions of the loading conveyor and discharge conveyor showing the switches which are actuated by the elevator and the boxes.

In operation, assuming that it is desired to convey boxes from the second floor to the first floor; that the gig is at the first floor and empty; and that a box is loaded on the conveyor 4 and moves downwardly thereon and onto the portion 6 until it strikes the stop 8; reference to Figs. 5 and 6 will show that the box, before hitting the stop 8, actuates the switch 24 which connects the power line 25 with the power line 26 through, and lights, the lamp 27 which is at the first floor. The operator at the first floor then presses the up-button 28 which starts the motor 29 UP to move the gig upwardly until it is stopped at the second floor by the opening of the gig-actuated switch 30. The operation of the switch 30 closes a circuit through the terminals 31 and the solenoid 23 which withdraws the stop 8 and tilts the portion 6 of the conveyor to the position 6' shown in Fig. 3, whereupon, the box on section 6 rolls downwardly onto the support 7 on the gig until it hits the stop 9. The tilting of the portion 6 stops the next following box on the conveyor 4 from moving thereon.

The box, leaving the portion 6 of the conveyor allows switch 24 to return to its normal open position and, going into the gig, actuates the switch 32 which establishes a circuit through the switch 33 and switch 34 to start the motor 29 DN (down). When the gig starts down, the circuit through the contacts 31 and the solenoid 23 is broken which allows the tilted portion 6 of the conveyor automatically to move back to the normal position and receive the next following box.

When the gig is in close proximity to the first floor, it automatically opens the switch 33 which stops the motor and closes a circuit through the contacts 35 and solenoid 10 to withdraw stop 9 and allow the box to roll off the gig onto the conveyor 36. As the box rolls down the conveyor 36, it moves switch 34 from its normal position shown in Fig. 6 to close a circuit through the contacts 37, but only as long as the box is in contact therewith.

With the tilting of the portion 6 to its normal position, the next box on the conveyor 4 rolls onto said portion and closes the switch 24, thus establishing a circuit from main line 25 through switch 24, push button 28, switch 30 and motor 29 UP to move the gig upwardly to receive another box and repeat the operations just described. If there is no following box, the switch 24 will remain open and nothing will happen. It will also be apparent that the gig, after being loaded, cannot move downwardly until the box on the conveyor 36 has passed beyond the switch 34 so that it can return to the position shown in Fig. 6 and which must necessarily be in the position shown in order to operate the motor 29 DN. The switches 38 and 39, respectively, may be manually operated to move the gig up if it is down, and to move it down, if it is up.

Although I have illustrated my invention with respect to an elevator serving only two floors, it is obvious that the system may be wired to serve any number of floors.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. In an automatic elevator having a gig adapted for conveying boxes from a receiving floor to a delivery floor; a first conveyor on said receiving floor on which said boxes are carried to the elevator; that portion of said conveyor adjacent said elevator and adapted to hold at least one of said boxes thereon being separate from but normally in alignment with the adjacent portion of said conveyor, whereby boxes may move freely from said conveyor onto said portion adjacent said elevator; a pivotal mounting for said separate portion adapting it to tilt toward said elevator; a stop for preventing a box from over-running said separate portion; a first switch, normally open when the portions of said conveyor are in aligned relation, but actuated to closed position by a box as it moves on to said tiltable portion; and means, including a second switch actuated by said gig when said gig is positioned to receive a box resting on the tiltable portion of said conveyor and said first switch has been closed by said box, for withdrawing said stop and tilting said separate portion of said conveyor toward said elevator.

2. The structure set forth in claim 1 in which the means for withdrawing said stop and tilting said separate portion is a solenoid.

3. The structure set forth in claim 1 in which a rocker arm having one end thereof connected to said stop and the other end connected to the higher end of said separate portion, is positioned below said portion; and a solenoid positioned below said rocker arm having its armature connected to said arm adjacent the end thereof connected to said stop.

4. In an automatic elevator adapted to convey boxes from a receiving floor to a delivery floor; the combination with a gig; means for raising and lowering said gig; a support for said boxes on said gig comprising a gravity roller conveyor adapted to carry at least one box thereon; a conveyor on said receiving floor for carrying boxes to said gig and having the portion thereof immediately adjacent said gig, when said gig is in a position to receive said boxes therefrom, comprising a tilting gravity roller conveyor adapted to hold at least one box thereon; a first, normally open switch on the tilting portion of said conveyor but movable to closed position by a box when on said portion; a stop on said portion normally positioned to stop the downward movement of a box thereon; means for withdrawing said stop and simultaneously stopping the following boxes on said conveyor from moving onto said tilting portion; means, including a second switch actuated by said gig when said gig is positioned to receive a box resting on said conveyor and said first switch has been closed by said box, for actuating said stop withdrawing means and said box stopping means; and means, including a third switch on said gig actuated by a box when moved thereon from said conveyor, for restoring the means for stopping the boxes on said tilting conveyor to their normal positions and starting said gig moving toward said delivery floor.

5. In an automatic elevator adapted for conveying boxes from a receiving floor to a delivery floor; the combination with a gig having a box support thereon comprising a plurality of rollers; a first conveyor for carrying boxes toward said elevator; means for stopping the movement of a box on said conveyor when in close proximity to said elevator; means automatically actuated when said gig is in a position to receive said box for withdrawing said stopping means and tilting toward said gig that portion of said conveyor on which said box is supported to cause said box to move downwardly thereon and onto the rollers in said gig; means for stopping the movement of said box when positioned on said gig rollers; means, including a switch actuated by said box when on said gig, for starting said gig toward said delivery floor, tilting to its original position that portion of said first conveyor from which said box was delivered to said gig and repositioning said stopping means on said first conveyor to stop the next box when received on said tilting portion of said first conveyor; a second conveyor on said delivery floor to receive boxes discharged thereon from said gig; means, including a switch actuated by said gig when in close proximity to said delivery floor, for withdrawing the stopping means on said gig to allow a box thereon to roll onto said second conveyor; and means, including a switch actuated by said box, when on said second conveyor, for restoring the stopping means on said gig to its normal position and moving said gig to said receiving floor to receive another box.

References Cited in the file of this patent

UNITED STATES PATENTS

| | | |
|---|---|---|
| 1,325,167 | Olson | Dec. 16, 1919 |
| 1,823,220 | Walters | Sept. 15, 1931 |
| 1,949,964 | Keller et al. | Mar. 6, 1934 |
| 2,548,767 | Brest | Apr. 10, 1951 |

FOREIGN PATENTS

| | | |
|---|---|---|
| 349,298 | Great Britain | May 28, 1931 |